United States Patent Office 3,468,948
Patented Sept. 23, 1969

3,468,948
PROCESS FOR THE MANUFACTURE OF ANHYDRIDES OF SORBIC ACID
Hans Fernholz, Fischbach, Taunus, and Hans-Joachim Schmidt, Frankfurt am Main, Germany, assignors to Farbwerke Hoechst Aktiengesellschaft vormals Meister Lucius & Brüning, Frankfurt am Main, Germany, a corporation of Germany
No Drawing. Filed Jan. 18, 1966, Ser. No. 521,419
Claims priority, application Germany, Jan. 27, 1965, F 45,067
Int. Cl. C07c 51/54
U.S. Cl. 260—549                              8 Claims

ABSTRACT OF THE DISCLOSURE

Method of making sorbic acid anhydrides by reacting the polyester of 3-hydroxy-hexenic-4-acid-1 with a monocarboxylic acid chloride or an ester formed between chlorocarbonic acid and a monohydric alcohol of an aliphatic or cycloaliphatic hydrocarbon.

---

The present invention relates to a process for the manufacture of anhydrides of sorbic acid.

Various processes are known for making carboxylic anhydrides, which processes are generally based on a reaction of free carboxylic acids, their salts or carboxylic acid halides. According to a widely used method, particularly for the manufacture of high molecular weight symmetrical carboxylic anhydrides, anhydrous carboxylic acids are heated with acetic anhydride or acetyl chloride as substances splitting off water, whereby a large quantity of intermediately formed mixed anhydrides of acetic acid with another carboxylic acid disproportionates under the reaction conditions to form acetic anhydride and the anhydride of the other carboxylic acid. In a similar manner, carboxylic acids react with ketene to form mixed anhydrides of acetic acid with another carboxylic acid.

In another known process, carboxylic anhydrides are obtained by reacting carboxylic acids with carboxylic acid halides, particularly carboxylic acid chlorides. The reaction is advantageously carried out in the presence of a tertiary amine base such as a pyridine or triethylamine as substance binding hydrochloric acid. Mixed anhydrides of carboxylic acids with carbonic acid alkyl esters, for example, the anhydride of sorbic acid with carbonic acid ethyl ester, can also be obtained by this process by reacting carboxylic acids with chlorocarbonic acid alkyl esters.

Another method for making carboxylic anhydrides, which also enables mixed carboxylic anhydrides to be obtained, is based on the reaction of carboxylic acid salts with carboxylic acid chlorides. In that process, it is also possible to start from carboxylic acid salts and then to produce the carboxylic acid chloride by adding phosphorus oxychloride, phosphorus pentachloride or thionyl chloride to the reaction mixture in an amount insufficient for a complete formation of carboxylic acid chlorides.

In these processes generally used for making symmetrical or mixed carboxylic anhydrides, it is necessary, however, to start from free carboxylic acids and to use the latter as such or convert them into their salts or acid chlorides.

Now we have found that sorbic anhydride, mixed anhydrides or sorbic acid with another carboxylic acid, and mixed anhydrides of sorbic acid with carbonic acid monalkyl esters can be obtained in a simple manner by reacting the polyester of 3-hydroxyhexenic-(4)acid-(1) with carboxylic acid chlorides or chlorocarbonic acid alkyl esters. The polyester is known in the art and is obtained in the manufacture of sorbic acid as an initial or intermediate product by the reaction of crotonaldehyde with ketene in the presence of fatty acid salts of bivalent metals.

As carboxylic acid chlorides, the acid chlorides of aliphatic, alicyclic or aromatic monocarboxylic acids may be used. Examples of such compounds are the acid chlorides of acetic acid, propionic acid, butyric acid, isobutyric acid, valeric acid, caproic acid, capric acid, lauric acid, myristic acid, palmitic acid, margaric acid, stearic acid, arachic acid, acrylic acid, methacrylic acid, crotonic acid, sorbic acid, oleic acid, linoleic acid, linolenic acid, monochloracetic acid, cyanoacetic acid, hexahydrobenzoic acid, benzoic acid, ortho-, meta- or paratoluic acid, and cinnamic acid. As chlorocarbonic acid alkyl esters, the esters of chlorocarbonic acid with monohydric alcohols of saturated aliphatic or cycloaliphatic hydrocarbons, which can easily be obtained by reacting the alcohols with phosgenes may generally be used. Exemplary of these compounds are the chlorocarbonic acid esters of methanol, ethanol, propanol, isopropanol, n-butanol, isobutanol, cyclopentanol and cyclohexanol.

When carrying out the process of the invention, the polyester of 3-hydroxyhexenic-(4)acid-(1) is advantageously reacted with the carboxylic acid chloride or the chlorocarbonic acid alkyl ester under the same conditions as required and commonly used for converting a free carboxylic acid into the anhydride or into mixed anhydrides with another carboxylic acid or with carbonic acid monoalkylesters. It is particularly advantageous to react the polymeric ester of 3-hydroxyhexenic-(4)acid-(1) with carboxylic acid chlorides or chlorocarbonic acid alkyl esters in an inert solvent in the presence of a tertiary amine base, for example pyridine, dimethylaniline or a trialkylamine, advantageously triethylamine, at a temperature within the range of —20° C. to +120° C. For 112 g. of polyester (equal 1 mole of the monomer on which the polyester is based, 1 to 1.2 moles of carboxylic acid chloride or chlorocarbonic acid alkyl esters and 1 to 1.5 moles of tertiary base are advantageously used. As inert solvents it is advantageous to use aromatic hydrocarbons such as benzene, toluene, xylene or ethylbenzene, aliphatic or aromatic chlorinated hydrocarbons such as chloroform, carbon tetrachloride or chlorobenzene, or ethers such as dialkyl ethers, dioxane or tetrahydrofurane. Since the polyester of 3-hydroxyhexenic-(4)acid-(1) is substantially inert towards carboxylic anhydrides, it is also possible to use, as solvents, carboxylic anhydrides or the mixtures thereof with other solvents. If, advantageously, a carboxylic anhydride is used which is derived from the same carboxylic acid as the carboxylic acid chloride to be reacted with the polyester, disproportionation to the symmetrical carboxylic anhydrides can be strongly reduced in the manufacture of mixed anhydrides of sorbic acid with another carboxylic acid and the yield of mixed anhydride can be increased.

The temperatures to be used for the reaction of the polyester with acid chlorides in the presence of a tertiary amine base may be varied within wide limits and depend substantially on the thermostability of the anhydrides. The reaction of the polyester with carboxylic acid chlorides is advantageously carried out at a temperature within the range of 40° C. to 100° C.; temperatures outside this range may also be used, without the yield being substantially reduced. The reaction of the polyester with chlorocarbonic acid alkyl esters is advantageously carried out at a temperature within the range of —20° C. to +20° C. because of the lower thermostability of the anhydrides of sorbic acid with a carbonic acid alkyl ester.

The reaction mixture so obtained in which the hydrochloride of the tertiary amine is still present in a suspended form may be used directly for further reactions, for example reaction with amino compounds to N-sorboyl amides. In many cases, particularly in order to isolate the anhydrides by distillation, it is advantageous, however, first to separate the hydrochloride of the tertiary amine in an appropriate manner, for example, by suction-filtration or washing out with water.

Alternatively, the mixture anhydrides of sorbic acid with another carboxylic acid may be obtained by heating the polymeric ester of 3-hydroxyhexenic-(4)acid-(1) with carboxylic acid chlorides to a temperature within the range of 50° C. to 120° C., in the presence of an inert solvent if desired, and continuously removing the hydrogen chloride which forms from the reaction mixture, advantageously by passing a stream of an inert gas such as nitrogen therethrough. For 112 g. of polyester (equal 1 mole of the monomer on which the polyester is based), 1 to 3 moles, advantageously 1.5 to 2.5 moles of carboxylic acid chloride are used.

When proceeding in this manner, it is also possible to use a mixture of the polyester with a carboxylic acid and to produce a carboxylic acid chloride in the reaction mixture by adding an inorganic acid chloride, such as thionyl chloride, phosphorus oxychloride or phosphorus pentachloride, in such an amount as is necessary for converting the carboxylic acid used into the corresponding acid chloride. The sorbic anhydride itself may also advantageously be obtained by starting from the polyester of 3-hydroxyhexenic-(4)acid-(1) and converting a part of this polyester into sorbic acid chloride by process described in U.S. Patent 3,322,825, granted May 30, 1967. The sorbic acid chloride so obtained is reacted further with the unreacted part of the polyester in accordance with the invention to form sorbic anhydride.

The process of the invention has the advantage that, instead of sorbic acid itself, an initial product in the production of sorbic acid is used in the process for the manufacture of sorbic anhydride or mixed anhydrides of sorbic acid with another carboxylic acid or with a carbonic acid alkyl ester and therefore a process step is eliminated.

The anhydrides of sorbic acid have interesting microbicidal properties. Owing to their great reactivity they may furthermore be used as intermediates for the manufacture of various sorbic acid derivatives. They may be reacted, for example, with hydroxyl compounds to obtain sorbic acid esters or with amino compounds to obtain sorbic acid amides which are of importance as preservatives having an antimicrobe action or as monomers to be used for the manufacture of plastics.

The following examples serve to illustrate the invention but they are not intended to limit it thereto.

Example 1

112 g. of the polyester obtained from ketene and croton aldehyde by the process of German Patent 1,042,573 were dissolved in 200 cc. of toluene. The solution was added while stirring, to a mixture prepared with cooling, of 200 cc. of toluene, 101 g. of triethylamine and 140.5 g. of benzoyl chloride. During the addition of the polyester solution, care was taken that the temperature of the exothermic reaction did not exceed 60° C. When the addition was terminated, the mixture was heated for 2 hours at 70 to 80° C. After cooling, the triethylamine hydrochloride which had precipitated was suction-filtered and the filtration residue was washed with a small amount of toluene. The combined filtrates were freed from toluene in vacuo and then subjected to a fractional distillation. 173 g. of the anhydride of sorbic acid and benzoic acid boiling at a temperature of 138° C. to 142° C. under 0.5 mm. of mercury were obtained, which corresponded to a yield of 80% of the theory.

Example 2

78.5 g. of acetyl chloride were added, while stirring and cooling, to a solution of 112 g. of the polyester described in Example 1 in a mixture of 400 cc. of toluene 101 g. of triethylamine. When the addition was terminated, the mixture was heated at 50° C. for 5 hours. After the reaction mixture had cooled down, the triethylamine hydrochloride which had precipitated was suction-filtered and the filtrate was distilled in vacuo over a Liebig condenser. The crude anhydride of sorbic acid and acetic acid, which passed over at a boiling point within the range of 85° C. to 100° C. under 1 mm. of mercury, was then distilled through a column. During this procedure, a partial disproportionation to acetic anhydride and sorbic anhydride could not be avoided. The yield of pure, redistilled anhydride of sorbic acid and acetic acid, boiling at 86° to 90° C. under 0.8 mm. of mercury, amounted to 41 g., which corresponded to 26.6% of the theory.

When the process was carried out under the same conditions but while using as solvent, instead of 400 cc. of toluene, a mixture of 250 cc. of toluene and 150 cc. of acetic anhydride, the yield of redistilled mixed anhydride of sorbic acid and acetic acid amounted to 69 g., which corresponded to 44.8% of the theory.

Example 3

92.5 g. of propionyl chloride were added to a temperature of at most 50° C., while stirring, to a solution of 112 g. of the polyester described in Example 1 in a mixture of 400 cc. of diisopropyl ether and 101 g. of triethylamine. The mixture so obtained was heated for 5 hours at 50° C. After the reaction mixture had cooled down, the triethylamine hydrochloride which had precipitated was suction-filtered, the filtrate was distilled in vacuo and the fraction passing over at a boiling point within the range of 80° C. to 105° C. under 1 mm. of mercury was then redistilled. 45 g. of a pure anhydride of sorbic acid and propionic acid boiling at 88° C. to 91° C. under 0.8 mm. of mercury, were obtained.

When the process was carried out in the same manner, but while using 400 cc. of propionic anhydride instead of diisopropyl ether, the yield of redistilled anhydride of sorbic and propionic acid amounted to 87 g., which corresponded to 51.8% of the theory.

Example 4

130.5 g. of sorboyl chloride were added, while stirring and cooling, to a solution of 112 g. of the polyester described in Example 1 in 400 cc. of toluene and 101 g. of triethylamine, and the mixture so obtained was heated for 3 hours at a temperature within the range of 70° C. to 80° C. After cooling, the reaction mixture was freed from salts which had precipitated and distilled in vacuo. 82 g. of sorbic anhydride having a boiling point of 145° C. to 147° C. under 0.5 mm. of mercury were obtained.

Example 5

A mixture of 112 g. of the polyester described in Example 1 and 157 g. of acetyl chloride was heated under reflux for 15 hours while a weak nitrogen stream was passed through. By subsequent fractional distillation, 29 g. of the anhydride of sorbic acid and acetic acid boiling at 86° C. to 90° C. under 0.8 mm. of mercury were obtained, which corresponded to a yield of 18.8% of the theory.

Example 6

60 g. of thionyl chloride were added to a solution of 112 g. of the polyester described in Example 1 in 400 cc. of toluene while stirring and passing a weak nitrogen stream through the reaction vessel. When the addition was terminated, the mixture was heated for 12 hours at a temperature of 70° to 80° C. By fractional distillation of the reaction mixture, 50 g. of sorbic anhydride boiling at 145° C. to 147° C. under 0.5 mm. of mercury were obtained.

Example 7

108.5 g. of chlorocarbonic acid ethyl ester were added at 0° C., while stirring, to a solution of 112 g. of the polyester described in Example 1 in a mixture of 400 cc. of dry chloroform and 101 g. of triethylamine. When the addition was terminated, stirring was continued for 1 hour at 0° C. The reaction mixture was then poured into ice water, the organic phase was washed once more with water, dried over magnesium sulfate and distilled in vacuo. 38 g. of the anhydride of sorbic acid with carbonic acid ethyl ester boiling at 148° C. under 20 mm. of mercury were obtained, which corresponded to a yield of 20.7% of the theory.

Example 8

18.5 g. of chlorocarbonic acid ethyl ester were added at 0° C., while stirring, to a solution of 112 g. of the polyester described in Example 1 in 400 cc. of dry chloroform and 101 g. of thiethylamine. Stirring was continued for 1 hour at 0° C. and the reaction mixture was shaken twice with 100 cc. of ice water. After drying over sodium sulfate, the chloroform layer was mixed with 94 g. of aniline and the whole was allowed to stand for 2 hours at room temperature, whereby 1.5 normal liters of carbon dioxide (67% of the theory) were evolved. The reaction mixture was then acidified with dilute hydrochloric acid, and cooled in ice water and the crystalline sorbic acid anilide was suction-filtered. After concentration and addition of 200 cc. of toluene, a further quantity of sorbic acid anilide could be obtained from the chloroform layer of the filtrate. The total yield amounted to 110 g. which corresponded to 59% of the theory.

What is claimed is:

1. A method for making sorbic acid anhydrides which comprises reacting, at a temperature from −20° C. to 120° C., the polyester of 3-hydroxy-hexenic-4-acid-1 with a member selected from the group consisting of monocarboxylic acid chlorides and esters formed between chlorocarbonic acid and monohydric alcohols of saturated aliphatic and cycloaliphatic hydrocarbons.

2. A method as in claim 7 wherein the reaction is carried out in the presence of a tertiary amine base.

3. A method as in claim 7 wherein the reaction is carried out in an inert solvent.

4. A method as in claim 9 wherein the reaction is carried out in the presence of a tertiary amine base.

5. A method as in claim 9 wherein said inert solvent is a carboxylic acid anhydride or a mixture thereof with another inert solvent.

6. A method as in claim 7 wherein said polyester is reacted with a monocarboxylic acid at a temperature from 40° C. to 100° C.

7. A method as in claim 7 wherein said polyester is reacted with a chlorocarbonic acid ester at a temperature from −20° C. to 20° C.

8. A method as in claim 7 wherein said polyester is reacted with a monocarboxylic acid chloride to a temperature from 50° C. to 120° C. while hydrogen chloride formed thereby is continuously removed.

References Cited

UNITED STATES PATENTS

| | | | |
|---|---|---|---|
| 3,097,996 | 7/1963 | Thoma, et al. | 167—22 |
| 3,222,302 | 12/1965 | Böllert et al. | 260—2.5 |

LORRAINE A. WEINBERGER, Primary Examiner

P. J. KILLOS, Assistant Examiner

U.S. Cl. X.R.

260—463, 484